United States Patent [19]

Gallagher

[11] Patent Number: 5,754,494
[45] Date of Patent: May 19, 1998

[54] CHARACTERISTIC DISCRIMINATING LANDMINE HAND PRODDER

[75] Inventor: Patrick J. Gallagher, Medicine Hat, Canada

[73] Assignee: Her Majesty in right of Canada as represented by the Minister of National Defence, Ottawa, Canada

[21] Appl. No.: 761,211

[22] Filed: Dec. 5, 1996

[51] Int. Cl.$^6$ .................................................. G01S 15/00
[52] U.S. Cl. ................................................ 367/87; 367/138
[58] Field of Search .......................... 367/87, 138, 135; 89/1.13; 73/591, 642, 644

[56] References Cited

U.S. PATENT DOCUMENTS

| | | | |
|---|---|---|---|
| 4,021,725 | 5/1977 | Kirkland | 89/1.13 |
| 5,159,838 | 11/1992 | Lynnworth | 73/644 |

OTHER PUBLICATIONS

"Impact Dynamics: The Split Hopkinson Pressure Bar" By Zukas et al., A Wiley–Interscience Publication, John Wiley & Sons, pp. 287–332.

"Split Hopkinson Pressure Bar Apparatus Overview and Simple Analysis" By Gallagher, Defence Research Establishment, Quebec, Canada, Jan. 1990, pp. 1–25.

"A Mechanical Means of Land Mine Detection—Winning Land Mine Detection Project", University of Alberta, CSME's National Competition, May 1996.

*Primary Examiner*—Daniel T. Pihulic
*Attorney, Agent, or Firm*—Sheridan Ross P.C.

[57] ABSTRACT

A hand-held prodder capable of distinguishing inert rock from potentially hazardous landmines or other unknown objects. The prodder comprises a rod which is placed into contact with an object. A high frequency acoustic or incident wave is introduced into rod and travels along the rod to the object where it is reflected back towards the piezoelectric crystal. The piezoelectric crystal converts the reflected wave to an electric signal and a signal processor determines values representative of the frequency-time-amplitude characteristics of the object. Different materials exhibit different mechanical impedances and frequency damping characteristics. By comparing reflected wave characteristics to predetermined characteristics for known materials, inert rocks and potentially hazardous plastic or metallic objects are distinguishable. Visual or audible signals inform the user whether rock (safe) or unidentified or known hazardous object were contacted.

15 Claims, 7 Drawing Sheets

Aluminum

FIG. 7.
Plastic

FIG. 8.
Rock

FIG. 9.

CHARACTERISTIC DISCRIMINATING LANDMINE HAND PRODDER

FIELD OF THE INVENTION

The present invention is directed to landmine prodding instruments, in particular to instruments which introduce and then analyse acoustic waves which travel within a prod placed in contact with unknown objects, and thus characterize the nature of the material of the object.

BACKGROUND OF THE INVENTION

Despite a variety of mechanised means now available for detecting and clearing landmines, the current hand tool of choice is the hand prodder. Personnel exhibit greater confidence when traversing a minefield which has been hand-prodded by their compatriots than they do with fields cleared by other means.

The hand prodder typically comprises a 30 cm long pointed rod extending from a gripping handle. The probe is generally non-magnetic to avoid setting off magnetically-triggered mines. The user probes the ground ahead and excavates any hard objects which the probe contacts. As the ratio of rocks to landmines in a minefield may number 1000:1, excavation of every contact is labourious, but very necessary.

Thus, it would be a significant advance in the art should a user be able to discriminate between landmines and rocks upon contact and without excavation. Accordingly, applicant sought to provide a hand probe which could distinguish variations in the object's material characteristics.

Figure 1:
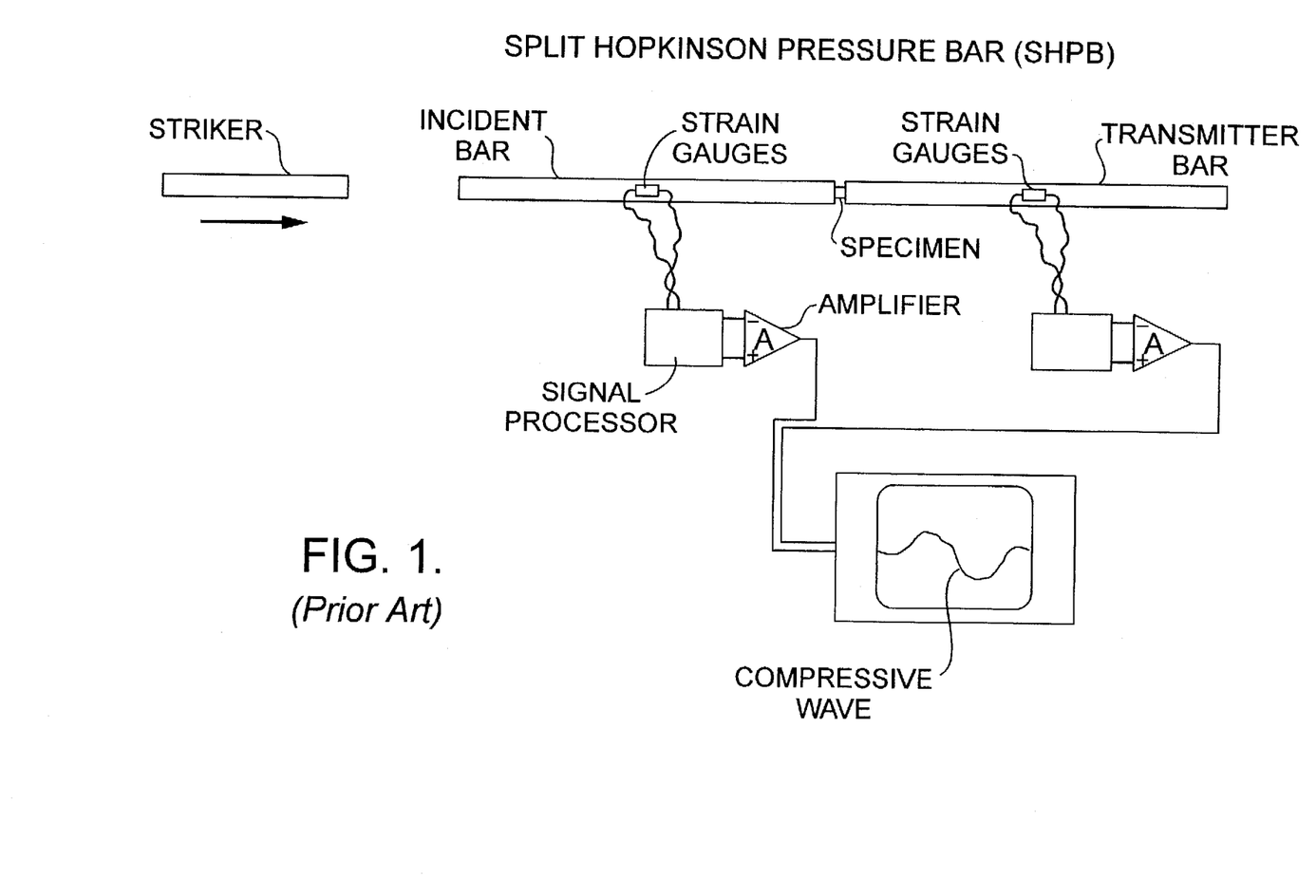
FIG. 1 is a schematic of a prior art materials testing apparatus known as the Split Hopkinson Pressure Bar.

As shown in FIG. 1, known apparatus for measuring the compressive characteristics of materials include the Split Hopkinson Pressure Bar apparatus ("SHPB"). The SHPB is typically used to apply rapid strain rates (100,000 mm/mm/second) to samples; compressing them for the measurement of mechanical properties. A sample is placed between the ends of two axially aligned elastic bars. Maintaining elastic conditions in the bar, the first "Incident" bar is struck, rapidly compressing the sample between the incident bar and the second "transmitter" bar.

The act of striking the incident bar sends a high frequency elastic mechanical pulse or compression wave through the bar. Like an acoustic wave, it reflects from interfaces having differing characteristics. Dependent upon the samples material characteristics, a portion of the wave reflects from the incident bar/sample interface and travels back along the incident bar. The remainder of the wave passes through the sample. A lesser reflection occurs at the transmitter bar/sample interface. The residual portion of the wave continues as a compression wave along the transmitter bar.

Strain gauges located on both the incident and transmitter bars enable calculation of the strain in the bars. In the incident bar, the displacement of the bar's end is proportional to the sum of the strain in the bar which is calculated from time-shifted strain gauge data obtained for both the incident and reflected waves. The displacement of the transmitter bar end is proportional to the strain measured in the transmitter bar. The sum of the displacements of the ends of the incident and transmitter bars defines the compression of the sample.

Mechanical impedance ("MI") is a material's characteristic which relates to the material's effect on acoustic wave transmission and reflection. Not surprisingly, MI affects the nature of the reflected wave in the SHPB's incident bar. The effect of MI on the SHPB apparatus, for materials having differing MI values, is described for three particular cases as follows.

In a first case, following the basic rules of mechanics of materials, if the MI of the sample is the same as that of the bar, then there is no reflective interface and thus no wave reflection at all; the sample is elastically displaced exactly as is the bar itself. The displacement at the bar's end is directly proportional to the measured strain ($\epsilon$).

If MI of the sample is very much greater than that of the bar, then the sample's MI is effectively infinity, and all of the incident wave is reflected. The incident and reflected waves are also in phase. The reflected wave is therefore also compressive and equal in magnitude to the incident wave. Thus the resultant bar end displacement is zero.

If the MI is zero (no sample at all, unconstrained bar end), the reflected wave is tensile, but of equal magnitude to the incident wave. The phase of the wave shifts 180° and is thus out of phase. In other words, the net stress cancels and the relative displacement at the bar end equals twice that for the first case ($2 \times \epsilon$).

In tabular form, the above cases and the general case are shown as:

| Case | MI Sample | Strain Incident $\epsilon_i =$ | Strain Reflected $\epsilon_r =$ | Proportional Displace $(\epsilon_i - \epsilon_r)$ |
|---|---|---|---|---|
| 1 | = bar | $\epsilon_i$ | 0 | $\epsilon_i$ |
| 2 | ∞ | $\epsilon_i$ | $\epsilon_i$ | 0 |
| 3 | 0 | $\epsilon_i$ | $-\epsilon_i$ | $2 \times \epsilon_i$ |
| General | ? | $\epsilon_i$ | $\epsilon_r$ | $(\epsilon_i - \epsilon_r)$ |

Knowing the relative displacements of the bars, the displacement imposed on the sample is also known. From the Young's Modulus (E) and the displacement of a bar, the imposed stress is also known. The force imposed is equal to the product of the stress and bar's cross-sectional area. Thus the strain and stress functions as they apply to the sample may also be determined.

As the loading on the sample substantially equalizes after a very short time, it is known to make a simplifying assumption and merely apply the strain results for either one of the incident bar or the transmitter bar. In another arrangement, the striker is permitted to impact directly on the sample, and the transmitter bar results alone are used to define the sample characteristics.

The question is, can such an approach be successfully applied to materials as diverse as plastics, minerals and metals and enable one to sort out non hazardous from the potentially hazardous prodder contacts.

SUMMARY OF THE INVENTION

The present invention provides a hand prodder having a rod which is modified to be analogous to the incident bar of a SHPB apparatus. The rod is fitted with means, preferably one of more piezoelectric crystals, for introducing an acoustic wave to the bar and for listening to reflected waves from any contacted objects. A signal processor analyses the reflected wave and establishes measurements representative of the characteristics of the object. This novel prodder provides the means for a method of identifying unknown objects, and more preferably distinguishing landmines from inert rocks.

The novel method comprises first positioning the rod into contact with an object. A high frequency compression or acoustic wave is introduced into rod. The incident elastic wave travels to the object where it is reflected back towards the piezoelectric crystal. The piezoelectric crystal converts the reflected wave to an electric signal. A signal processor processes the signal and establishes measurements of the frequency-time-amplitude characteristic of the object. As different materials have different MI and frequency damping characteristics, the reflected wave has frequency-time-amplitude characteristic which is different from the incident wave and is also distinctive of the material. The reflected wave characteristics are compared to predetermined wave "signatures" of known materials. If they match, the nature of the object is revealed—enabling discrimination of inert rocks and potentially hazardous plastic or metallic objects. Preferably the result of the comparison is signalled visually or audibly to alert the user to contact of a rock (safe) or of an unidentified or known hazardous object.

Preferably, a calibration of the frequency-time-amplitude characteristic of the rod alone is obtained (while the rod is not contacting any objects) so that one may extract its characteristics from the object's characteristics, thereby minimizing error due to prodder wear and other variables.

DETAILED DESCRIPTION OF THE PREFERRED EMBODIMENT

Figure 2:
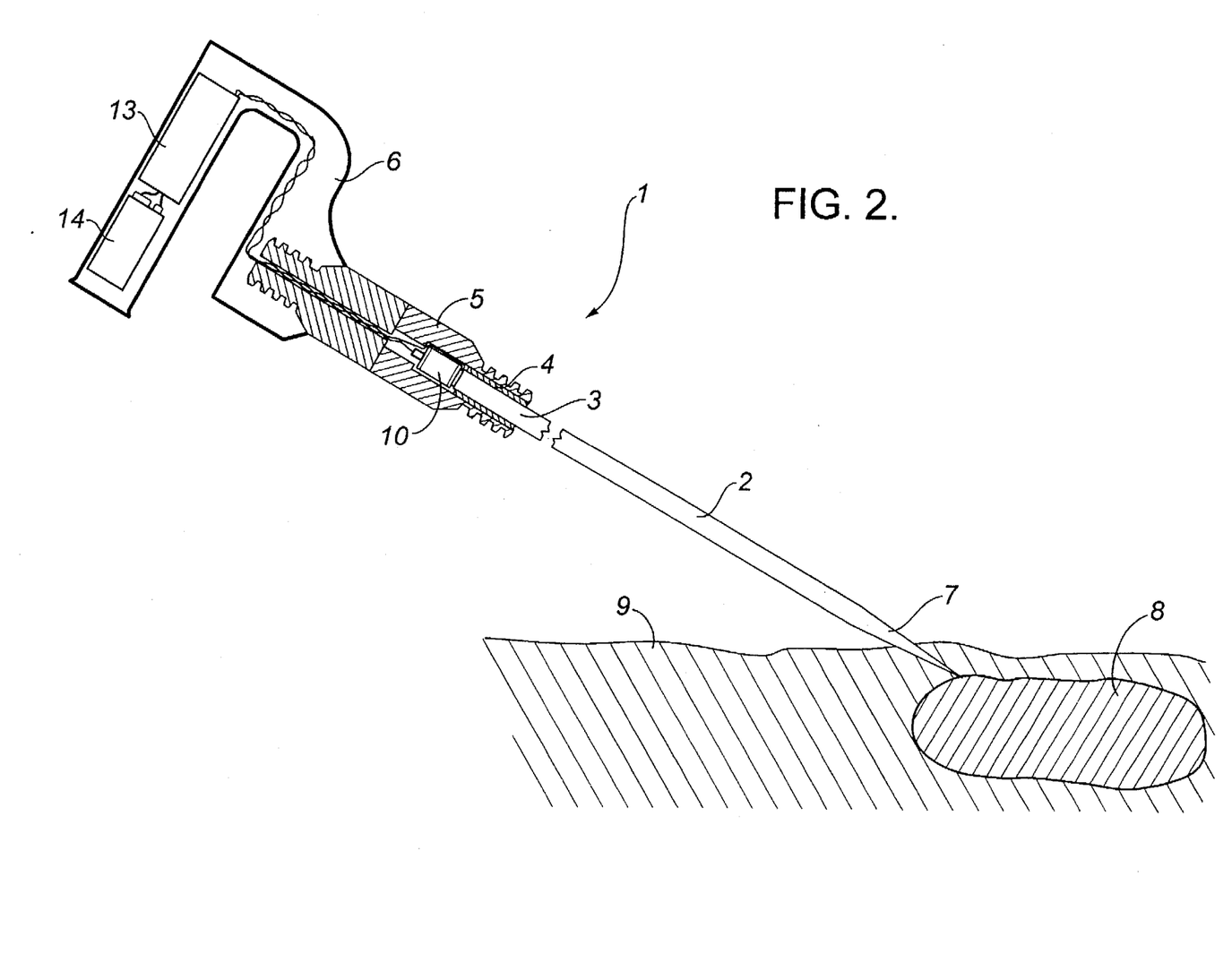
FIG. 2 is a cross-sectional view of the hand prodder contacting a sub-surface object.
Figure 3:
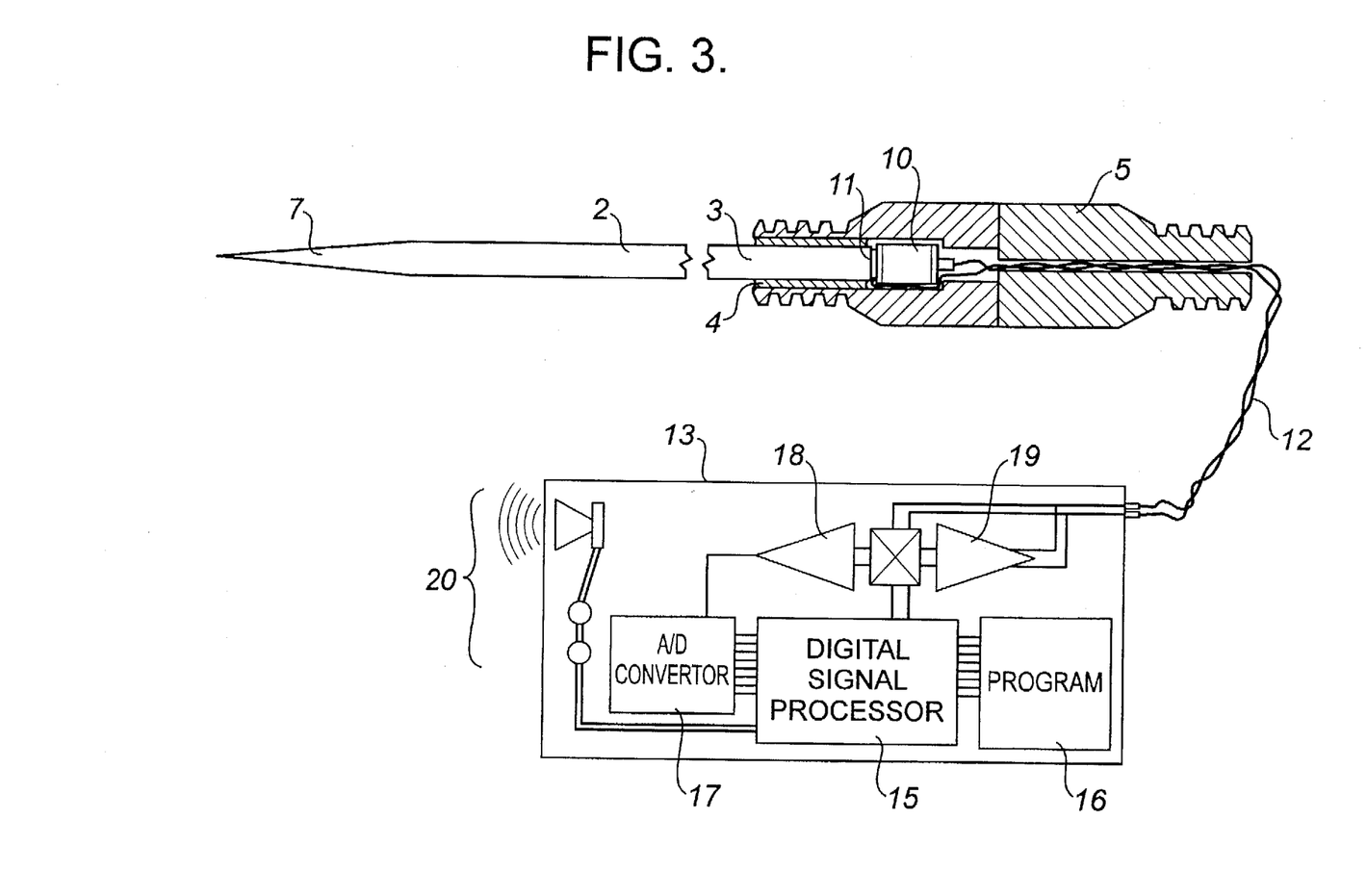
FIG. 3 is a cross-sectional view of the rod and piezoelectric crystal portion of the prodder, coupled to the signal processing module.

Having reference to FIGS. 2, 3, a hand-probing mine detector 1 is provided. The prodder comprises a rod 2 having a first end 3 flexibly supported by an annular rubber coupling 4 in a mounting nub 5. The nub 5 is screwed into a handle 6. The rod has a pointed second end 7 for sensing objects 8 buried in the ground 9. A protective sheath (not shown) fits over the rod's second end 7 and threads to the nub 5.

The rod 2 is 45 cm long and is formed of non-magnetic, austenitic stainless steel. Only 30 cm project from the rubber coupling 4. The rubber coupling 4 lessens the rigidity between the rod 2 and handle 6.

Best seen in FIG. 3, a piezoelectric crystal 10 is glued to the first, or driver end 3 of the rod 2. When an electric field is applied to the crystal 10, a mechanical strain will occur and drive mechanical energy into the rod's driver end 3. Conversely, when the crystal 10 is mechanically stressed, an electric charge is produced. A suitable crystal is a 15 mm long, 6.35 mm diameter poly-crystalline ceramic cylinder, model Sonex P-41 available from Hoechst CeramTec, Mansfield, Mass. The crystal 10 is electrically insulated from the rod 2 with a ceramic insulator 11.

Positive and negative electrical leads 12 from the crystal pass through the nub 5 for bi-directional electrical signal transmission between the crystal 10 and an electronics module 13. Shown in FIG. 1, the module 13 is installed within the prodder's handle and is powered with 9 V batteries 14.

The electronics module 13 is capable of two modes: a driver mode and a signal processing mode. In the driver mode, an electrical signal is transmitted along leads 12 to the crystal 10 for generating a piezoelectric mechanical pulse. The pulse is introduced into the rod's driver end 3. In the signal processing mode, any electrical signals generated by the crystal 10 are transmitted along leads 3 for processing by the electronics module 13.

More specifically, the module 13 comprises a digital signal processing microcomputer 15, an EPROM 16 containing program instructions and digital storage means, an A/D converter 17, a signal input amplifier 18 and a driver output amplifier 19. An audio/visual binary output device 20 is provided.

A suitable signal processor is a model ADSP-2181 digital signal processing microcomputer by Analog Devices, Inc., Norwood, Mass. The ADSP-2181 contains a high speed serial port, 16 bit data processing capabilities and has both onboard program RAM and data memory RAM. For permitting battery powered operation, the ADSP-2181 features a power saving "sleep" mode. After downloading of program instructions from the EPROM, the ADSP-2181 will reduce its power consumption and await a suitable trigger before "waking-up" to begin signal processing.

Figure 4:
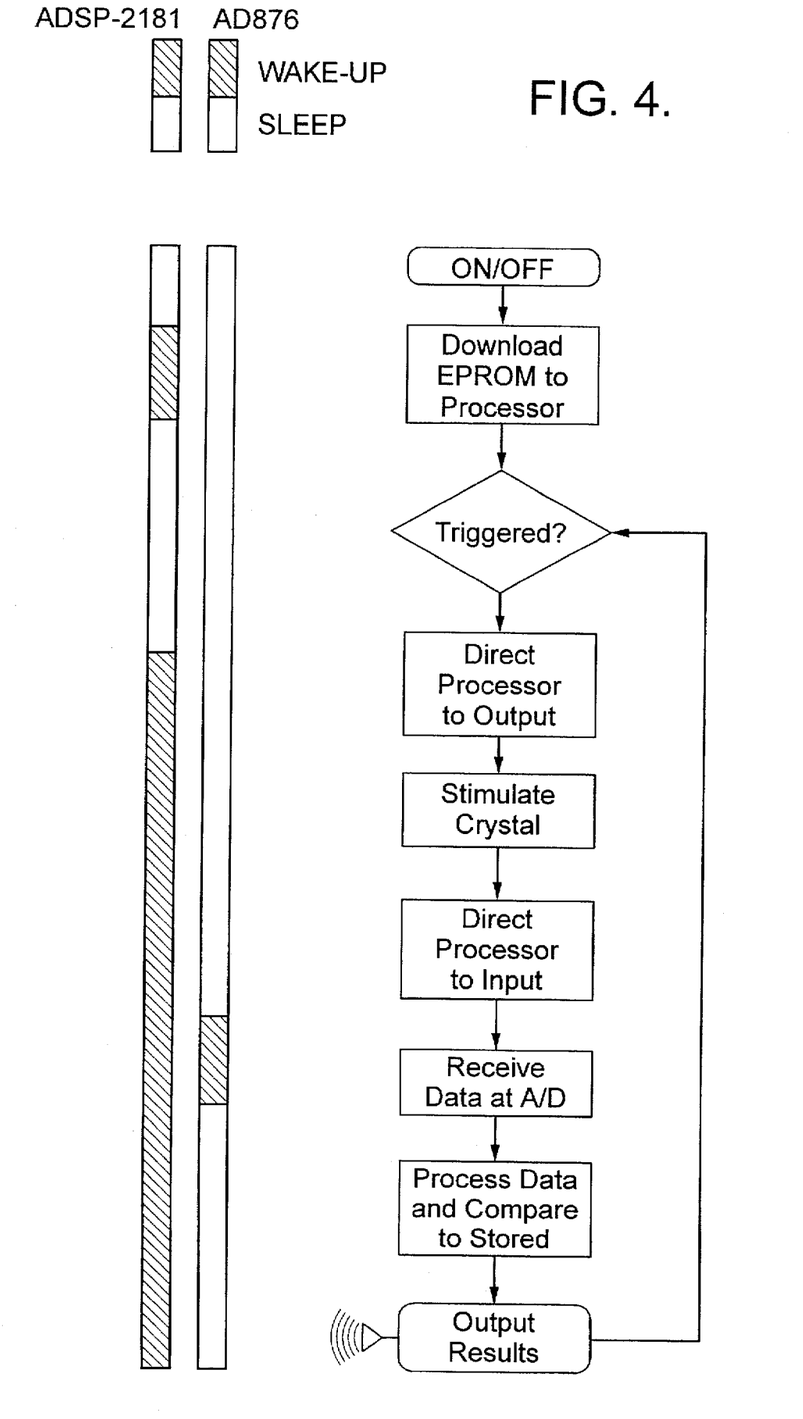
FIG. 4 is a flow chart of the digital signal processor and A/D functions. The periods of active "wake-up" and "sleep" operations trace the flow chart steps.
Figure 5:
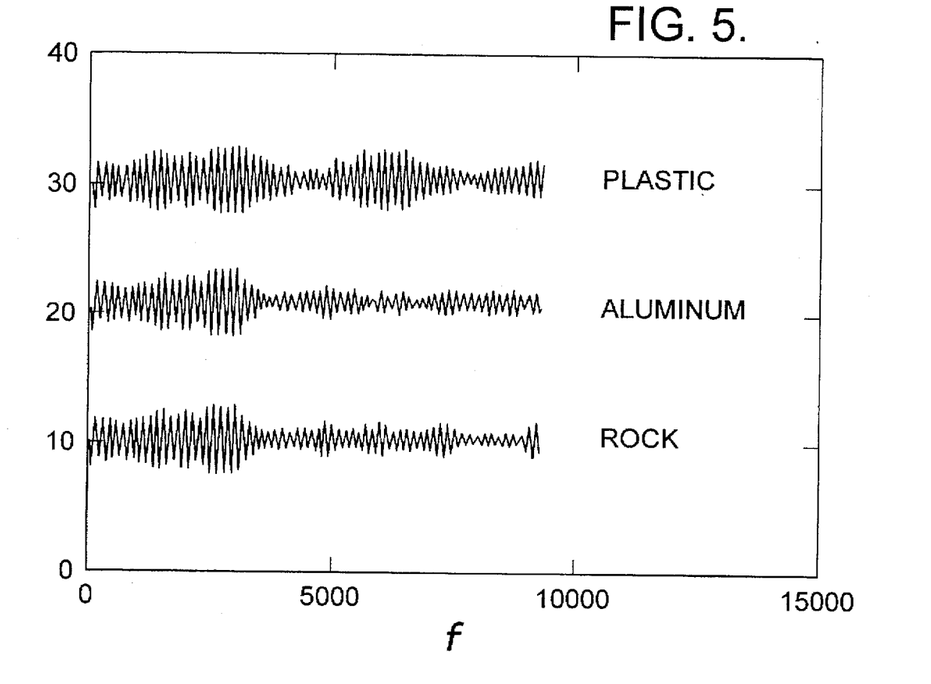
FIG. 5 illustrates the raw piezoelectric signals for plastic, aluminum and rock.

Having reference to the flow chart in FIG. 4, when the prodder is activated, the EPROM 16 downloads the analysis program to the ADSP-2181 processor 15 and awaits a trigger. When triggered (ie. contact of the rod's sensing end with an object) the EPROM 16 signals the driver output amplifier 19 to generate an ultrasonic analog driver signal (20–200 kHz). The driver signal stimulates the crystal 10 to generate a mechanical pulse and send it as an acoustic incident elastic wave down the longitudinal axis of the rod 2. The incident elastic wave reflects from the object 8 at the rod's sensing end 7 and returns to the rod's driver end 3 as a reflected wave. The mechanical energy in the reflected wave stimulates the crystal 10 to generate electrical analog signals characteristic of the reflected wave. FIG. 5 illustrates typical reflected waves for plastic, aluminum and mineral (rock) objects 8.

Practically, the form of the reflected wave will have characteristics which fall between that which is received in response to either of the two boundary cases; one where there is no object; and secondly where the object is infinitely stiff. Thus the phase shift and the energy.

The analog signals are processed through the signal input amplifier 18 and converted by the A/D converter 17 for analysis by the signal processor 15. A suitable A/D converter is available as model AD876 10 bit, 20 MSPS (million samples per second) CMOS converter, also from Analog Devices, Inc. The AD876 is also capable of a "sleep" mode.

The digital processor 15 stores the reflected data in its RAM memory. The characteristics of the reflected signal are dependent upon the material characteristics of the object 8. Different materials have different MI and frequency-dependent damping coefficients. Analysis of the reflections and damping rates demonstrated in the reflected data is instructive of the material characteristics of the object.

Accordingly, using one analytical technique, the stored data is conditioned using a stepping FFT and analyzed for frequency-time-amplitude information. A 256 point FFT from a 1024 sample is advanced in 128 sample steps which yields 7 time-slices of FF transformed data.

Figure 6:
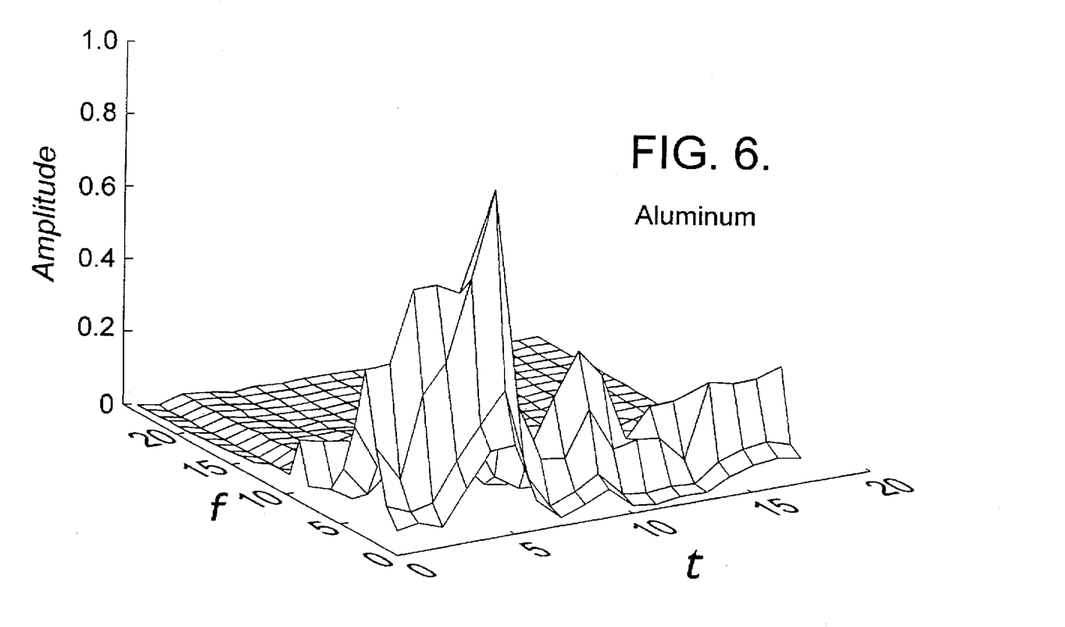
FIG. 6 depicts the power chart (frequency-time-amplitude) for aluminium, after the processor conditioned the signal of FIG. 5 using Fast Fourier Transform.
Figure 7:
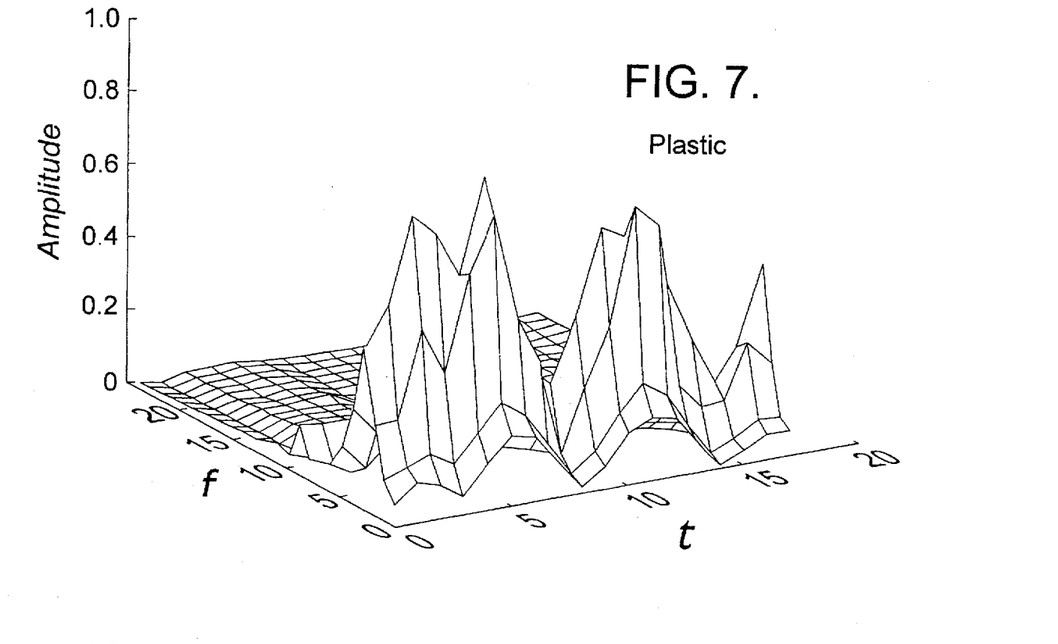
FIG. 7 depicts the power chart for plastic.
Figure 8:
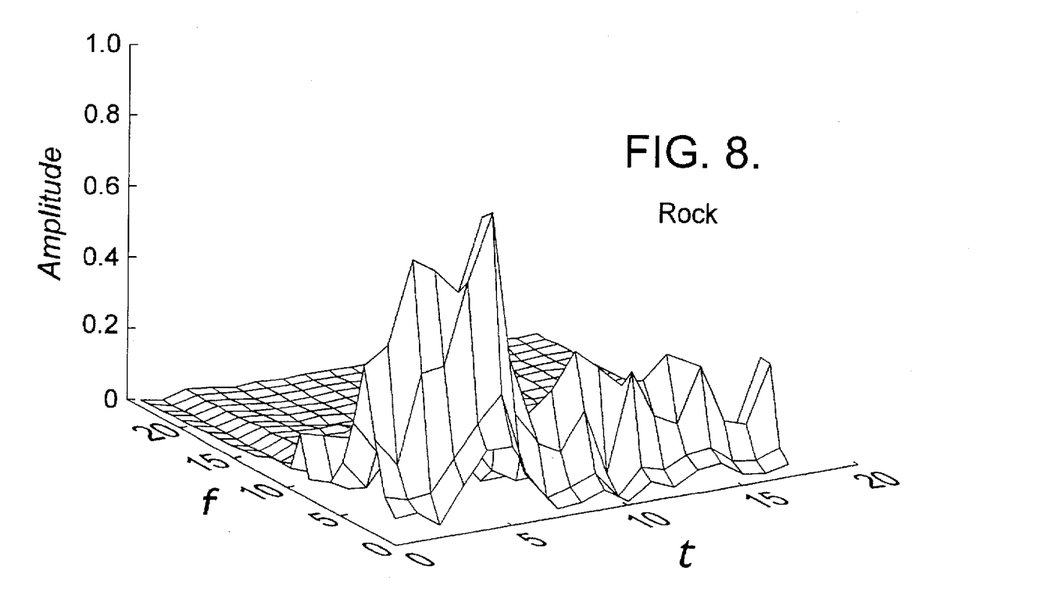
FIG. 8 depicts the power chart for rock.

The characteristics distinctive of the material are generally located within the first 5-10 harmonics or bins of the transformed data. FIGS. 6, 7, 8 illustrate the transformed data for the signals of FIG. 5.

First, the effects of the peculiar characteristics of the rod are calibrated by causing the piezoelectric crystal to send a pulse along the rod when its sensing end is not contacting anything. This "dry-fire" provides a baseline reading which accounts for individual characteristics including the tapered point of the bar, wear, temperature, and accumulated debris. This resulting baseline power data is subtracted from the actual contact data.

Average signal frequency-time-amplitude or power data, contained within 5 frequency by 7 time slices of the FF transformed data, are compared against pre-determined and stored average map values for known materials.

Figure 9:
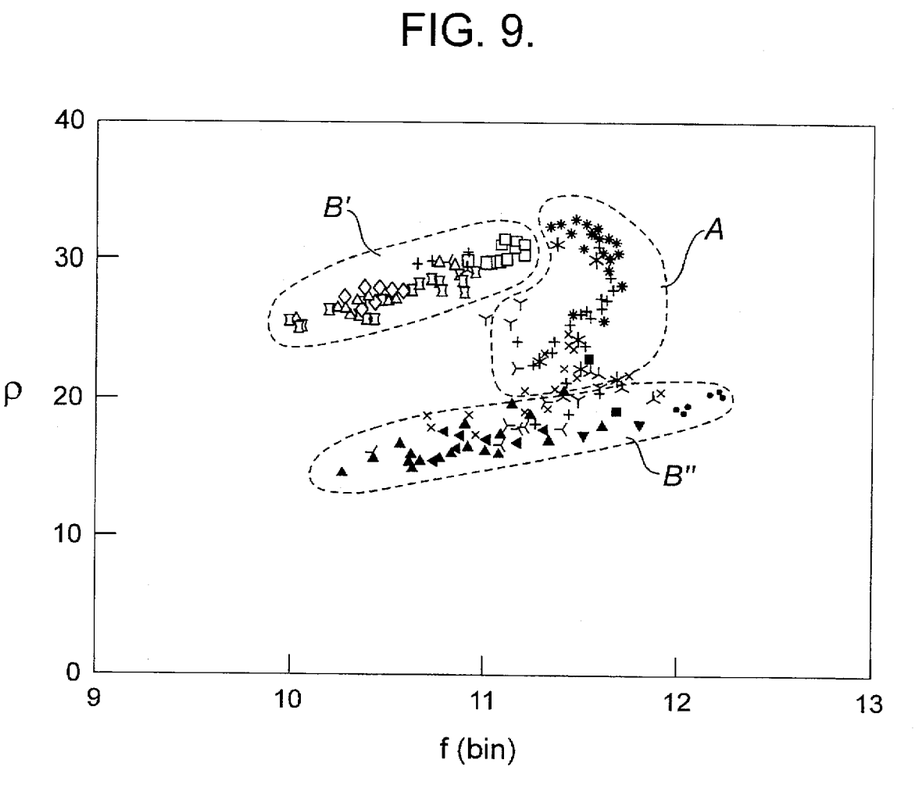
FIG. 9 is a map of the average transformed frequency-time-amplitude for a plurality of tests, illustrating distinct grouping of test results for metals (lower solid symbols), plastics (upper open symbols) and rock (line symbols).

FIG. 9 illustrates mapped test results for a large number of samples of a variety of metals, plastic and rock, representing common conditions in landmine detection conditions. The three material types showed up as three distinct groupings with some overlap.

The processor 15 performs a comparison of a map of the transformed signal and mapped known groupings. The comparison is directed to differentiation between a first group A representing rock (excluding indistinct overlap areas), and a second group representing the plastics B', metals B" and the overlap areas. The signal processor signals the audio/visual output device 20 to signal one of two results: safe—definitely a rock, or bad/suspect—something other than a rock. Use of two distinctive audible tones and green/red LED lights serve this purpose.

Non-contact calibration can be done before each use to account for physical prodder variations. The extraction of the baseline rod characteristics heightens the sensitivity of the signal analysis, having removed a portion of the signal which is not attributable to the object. Similarly, the non-contact data can be compared against stored laboratory calibration to alert the user to performance variation beyond safe limits.

Alternate means for generating signals indicative of the reflected wave include using strain gauges or by providing a second piezoelectric crystal separate from the driver crystal. Further, as the reflected wave can be affected by the pressure of the contact with the object, it may be desirable to mathematically remove the effects using additional signal processing.

In an alternate analytical technique, some of the computing intensity required by the FFT technique can be simplified by substitution of a phase analysis technique. By mixing or multiplying non-contact wave data and the reflected wave data, the phase differences become apparent and the phase angle shifts determinable. As was the case with power data determine using FFT analysis and depicted in FIG. 9, phase angle shift analysis will result in phase shift angles which are indicative and distinctive of metals, rocks and plastics.

Electronic noise can be compensated for by producing a quick succession of pulses upon contact with the object and statistically averaging the resulted for the corresponding reflected waves for improving confidence in the results.

The embodiments of the invention in which an exclusive property or privilege is claimed as defined as follows:

1. A prodding rod having a driver end and a sensing end for contacting an object of unknown material comprising:

means at the support end for imparting mechanical energy into the rod which travels as an incident elastic wave from the driver end towards the sensing end and reflects from the object as a reflected elastic wave traveling towards the driver end;

means for analyzing the reflected elastic wave for its acoustical characteristics and emitting electrical signals indicative of the acoustical characteristics of the object; and means for processing the signals for comparing the object's acoustic characteristics against stored values representative of the acoustic characteristics of known materials so as to categorize the object's material.

2. A prodding rod as recited in claim 1 wherein the energy imparting means is a piezoelectric crystal.

3. A prodding rod as recited in claim 1 wherein the means for detecting the acoustic characteristic of the reflected wave is a piezoelectric crystal.

4. A prodding rod as recited in claim 1 wherein the means for processing the detected acoustic characteristics comprises:

a signal processor which Fast Fourier Transforms reflected wave signals into frequency-time-amplitude values and compares that data against stored frequency-time-amplitude values obtained from use of the prodding rod with materials having known acoustical characteristics so that the nature of the object's material can be identified.

5. A hand-held, non-magnetic prodding rod used for the detection of land mines, the rod having a driver end and a sensing end for contacting an object of unknown material comprising:

means at the support end for imparting mechanical energy into the rod which travels as an incident elastic wave from the driver end towards the sensing end and reflects from the object as a reflected elastic wave traveling towards the driver end;

means for analyzing the reflected elastic wave for its acoustical characteristics and emitting electrical signals indicative of the acoustical characteristics of the object; and means for processing the signals for comparing the object's acoustic characteristics against stored values representative of the acoustic characteristics of known materials so as to categorize the object's material.

6. A landmine prodding rod as recited in claim 5 wherein the energy imparting means and the acoustic characteristic detecting means are piezoelectric crystals.

7. A landmine prodding rod as recited in claim 5 further comprising a visual or audible signal which is representative of the category the object is determined to be in.

8. A landmine prodding rod as recited in claim 5 further comprising batteries for powering the energy imparting means and signal processing and comparing means.

9. A method of determining the nature of the material of an object prodded by a rod having first and second ends, comprising the steps of:

(a) placing the second end of the rod in contact with the object;

(b) imparting an incident elastic wave into the first end of the rod so that it travels longitudinally along the rod to the second end where the wave reflects to form a reflected wave travelling back towards the first end;

(c) measuring the acoustic characteristic of the reflected wave and emitting electrical signals indicative thereof; and (d) processing the signals so as to establish measurements characteristic of the material of the object.

10. The method recited in claim 9 further comprising comparing the processed characteristics against stored characteristics of known materials so as to categorize the object's material.

11. The method recited in claim 9 wherein the material characteristics for known materials are measured by:

calibrating the prodder by first performing steps (a)–(d) of the method on materials of a known nature and storing the measured characteristics; and comparing the processed characteristics against the stored characteristics of known materials so as to categorize the object's material.

12. The method recited in claim 9 wherein the prodder emits a unique visual or audible signal representative of the category the object is determined to be in.

13. The method recited in claim 9 further comprising:

(e) calibrating the prodder by first performing steps (a)–(d) of the method on materials of a known nature to measure gross characteristics representative of both the known material and the rod;

(f) performing steps (a)–(d) of the method without contacting an object at all to measure baseline characteristics of the rod alone;

(g) extracting the baseline from the gross characteristics so as to establish measurements of the characteristics of the known material alone;

(h) performing steps (a)–(d) of the method on an object of unknown characteristics to measure gross characteristics being representative of both the unknown material and the rod;

(i) extracting the baseline characteristics of the rod so as to establish measurement of the characteristics of the unknown material alone; and (j) comparing the extracted characteristics of the unknown object and known objects so as to categorize the object's material.

14. The method recited in claim 12 wherein the prodder emits a unique visual or audible signal representative of the category the object is determined to be in.

15. The method recited in claim 9 wherein the prodder is used to determine the nature of objects which are suspect as being landmines and accordingly emits a binary visual or audible signal to indicate whether the material of the object is determined to be in the category of either a non-hazardous rock or of other material of unknown hazard.

* * * * *